United States Patent (10) Patent No.: US 8,345,660 B2
Filoso et al. (45) Date of Patent: Jan. 1, 2013

(54) WIRELESS MESH NETWORK CONTROLLER SYNCHRONIZATION

(75) Inventors: John P. Filoso, Pleasant Grove, UT (US); Jay Douglas George, Orem, UT (US)

(73) Assignee: Digi International Inc., Minnetonka, MN (US)

( * ) Notice: Subject to any disclaimer, the term of this patent is extended or adjusted under 35 U.S.C. 154(b) by 301 days.

(21) Appl. No.: 12/774,932

(22) Filed: May 6, 2010

(65) Prior Publication Data

US 2011/0274020 A1 Nov. 10, 2011

(51) Int. Cl.
H04J 3/06 (2006.01)
(52) U.S. Cl. .......................... 370/350; 370/236; 370/503
(58) Field of Classification Search .................. 370/236, 370/311, 324, 350, 503
See application file for complete search history.

(56) References Cited

U.S. PATENT DOCUMENTS

| 5,734,642 | A | * | 3/1998 | Vaishnavi et al. | 370/255 |
| 6,788,924 | B1 | * | 9/2004 | Knutson et al. | 455/265 |
| 7,779,109 | B2 | * | 8/2010 | Carlson et al. | 709/223 |
| 7,995,467 | B2 | * | 8/2011 | Fitch et al. | 370/221 |
| 2006/0099980 | A1 | * | 5/2006 | Nielsen et al. | 455/507 |
| 2007/0177567 | A1 | * | 8/2007 | Parys | 370/346 |
| 2010/0260155 | A1 | * | 10/2010 | Grilli et al. | 370/336 |

* cited by examiner

Primary Examiner — Kwang B Yao
Assistant Examiner — Nguyen Ngo
(74) Attorney, Agent, or Firm — Schwegman Lundberg & Woessner, P.A.

(57) ABSTRACT

A set sleep period is coordinated among a plurality of mesh network nodes to conserve power. A controller is synchronized with an existing wireless mesh network by sending a network synchronization signal from the controller indicating that sleep timing information is lost, and receiving a reply from one or more wireless mesh network nodes within the existing wireless mesh network comprising sleep timing information for the wireless mesh network.

13 Claims, 2 Drawing Sheets

WIRELESS MESH NETWORK CONTROLLER SYNCHRONIZATION

FIELD OF THE INVENTION

The invention relates generally to mesh networks, and more specifically in one embodiment to wireless mesh network controller synchronization.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

One such example is the Bluetooth technology that enables a cell phone user to associate and use an earpiece in what is sometimes referred to as a personal area network or PAN. Another example is a mesh network, in which a number of devices work together to form a mesh, such that data can be sent from a source device to a destination device via other devices in the mesh network.

Mesh networks often include multiple links from a network node to other network nodes nearby, and can thereby provide routing around broken links or paths by discovering other routes through the mesh to a destination node. New nodes to a mesh network are typically able to automatically discover the mesh network when they are activated in the vicinity of a compatible mesh network, and can easily join the network. Mesh networks are often controlled by a coordinator device, such as a line powered device that acts as an interface between the mesh network and the Internet.

But, joining a mesh network becomes somewhat more complex in network environments where different frequencies or network identifiers are used. In ZigBee mesh networks, for example, different frequencies or channels can be used for different networks, such as to prevent nodes from one network from interfering with another network. A new node wishing to join a network must therefore find the appropriate frequency or channel being used by the intended network before it can join the intended network. This is performed in one example by searching among the various available channels until a mesh network is found, but confirming that the node has joined the intended network is difficult.

In addition to searching various frequencies or channels, some wireless mesh network technologies also sleep, or become inactive, to conserve power. For example, an array of battery powered sensors might be configured to wake up once every two hours and take a measurement, report the measurement via the mesh network, and go back to sleep. Use of sleeping nodes typically includes allowing end devices with reduced functionality to sleep, such as between taking and reporting measurements via router nodes that do not sleep. In other embodiments sleep times are synchronized between nodes in the network during configuration, so that all nodes are awake and able to contribute to mesh network communication at the same time.

But, if the controller fails or loses sleep timing information, it may not be able to communicate with the mesh network during the few milliseconds that the mesh network is awake between sleep periods. There exists a need to provide wireless mesh network technology that addresses management of a mesh network with sleeping nodes.

SUMMARY

Some example embodiments of the invention comprise a wireless mesh network having a set sleep period coordinated among a plurality of mesh network nodes to conserve power. A controller is synchronized with the wireless mesh network by sending a network synchronization signal from the controller indicating that sleep timing information is lost, and receiving a reply from one or more wireless mesh network nodes within the existing wireless mesh network comprising sleep timing information for the wireless mesh network.

DETAILED DESCRIPTION

Figure 1:
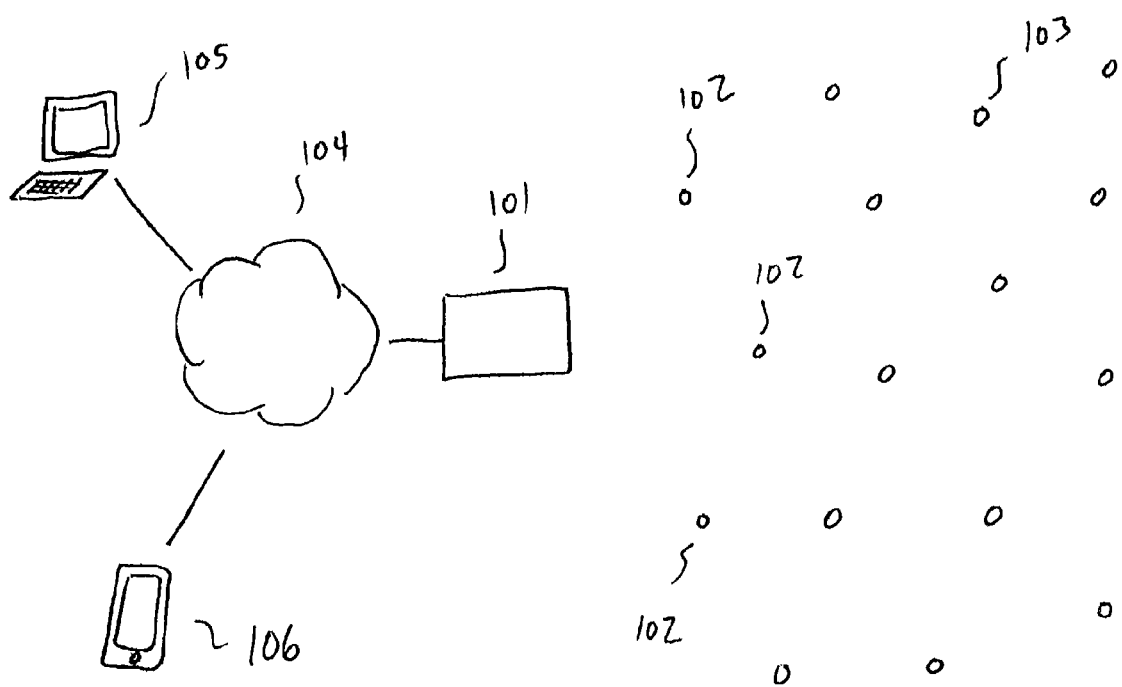
FIG. 1 shows an example wireless mesh network environment, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Mesh networks are often used to route data between various elements or nodes in a network made up of a number of loosely assembled nodes. Many mesh networks are designed such that a compatible node can easily join the network and receive and send data, including passing received data along a route to an intended destination node. Mesh networks are therefore often self-healing, in that if a node becomes inoperable or loses a connection to another node, data can be easily routed around the broken network link.

Many mesh network technologies use wireless communication, further enhancing the ease of use of mesh networking for certain applications. Because mesh network nodes are typically stationary, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network.

One example of a mesh network standard using wireless radio communication is the ZigBee mesh network, which was developed by an industry alliance and is related to IEEE standards including 802.15.4. The retail price of ZigBee-compliant transceivers is nearly a dollar, and a transceiver, memory, and processor can be bought for a few dollars in quantity, making integration of mesh network technology into inexpensive electronic devices economically practical. The standard is intended to support low power consumption at reasonably low data rates, and provides a self-organizing network technology that works well for applications such as control, monitoring, sensing, and home automation.

In this example of wireless mesh technology, one node operates as a coordinator, forming the root of the mesh network and performing other functions such as bridging to other networks and handling encryption keys. Most nodes are router nodes, which can receive and send data, including passing data along to other nodes. In some embodiments, end device nodes contain just enough functionality to receive and send data, but cannot route or pass data from a sending node to a different receiving node. While this preserves battery life and reduces the cost of the node, end device nodes are unable to contribute to the routing functions of the mesh network, and so will typically not make up a large percentage of a mesh network's nodes.

Nodes in some mesh networks can also conserve power by entering a sleep mode, or becoming inactive for extended periods of time when operation is not necessary. For example, a mesh network of ground moisture sensors may only need to take and report measurements every two hours, and need only be awake for a few milliseconds every two hour period. The sleeping nodes in a further embodiment of such a network are synchronized during configuration of the network so that they wake at the same time, enabling the nodes to communicate with each other while awake and route data from neighboring nodes.

In wireless mesh networks that sleep to conserve power, the coordinator device is responsible for coordinating information across the network, including setting and distributing the sleep timing information. Should the controller lose power, or otherwise have its timing data corrupted, it is unlikely to be able to communicate with the network nodes during the few milliseconds that the network is awake between sleep periods. In some methods to recover timing synchronization, the controller sends a synchronization signal through the network, reestablishing timing synchronization between the nodes and the controller.

This not only involves changing the synchronization of each of the nodes in the network, but also relies on the synchronization signal being sent during the relatively brief period during which the network nodes are awake and listening on their wireless network connections. As a result, it will often take many sleep/wake cycles for a mesh network to resynchronize with a replaced controller using such a method.

In an improved method to resynchronize the wireless mesh network with the controller, the controller sends out a rapid or continuous series of synchronization pulses, or other signals indicating that the controller is attempting to resynchronize with the mesh network. At least one of the wireless mesh network nodes receives the signal during the node's next wake period, and recognizes that the controller is trying to resynchronize with the mesh network. The node then forwards synchronization or timing information to the controller, which is able to join the mesh network without resetting the timing information in the mesh network nodes.

The controller is able to send rapid synchronization pulses or another indicator of lost synchronization without impacting network life or performance because it is typically connected to a power line, and not dependent on battery power. The controller can therefore easily send a signal often enough that a mesh network will recognize the signal at least once during its brief wake period, which is often on the order of milliseconds.

The controller signal sent is in some embodiments simply a traditional synchronization pulse, but sent often enough that a mesh network node can detect that the signal is being repeated at an abnormally fast rate during its wake period and send synchronization information to the controller in response. In other embodiments, some other type of signal is sent to the mesh network nodes indicating that the controller is attempting to resynchronize, prompting the receiving mesh network node to forward synchronization information back to the controller so that it can synchronize with the existing network.

The nodes within radio range of the controller are said to be within the first layer or first hop of the network, and any or all such nodes can reply to the controller's synchronization signal. The reply in some embodiments contains a time synchronization signal, such that all nodes have synchronized clocks. In a further example, the reply also includes sleep period timing information, such as sleep time and period information or wake time information.

In some embodiments, the controller is further able to receive information reported by the mesh network nodes during their next wake period, such as monitored security monitoring data, soil moisture, or any other type of data the nodes are configured to collect and report. The controller therefore does not lose data from any scheduled data collection period, and is able to resynchronize with the network on the first network wake period after the controller loses timing information.

FIG. 1 is a diagram of a mesh network, consistent with an example embodiment of the invention. A gateway device 101 here includes a mesh network radio, and serves as a controller node for the mesh network. First hop or first layer wireless mesh network nodes 102 are within radio range of the controller 101, and are operable to directly exchange information with the controller. The wireless mesh network also includes nodes 103 that are farther removed from the controller, and exchange data with the controller through one or more other wireless mesh network nodes.

The controller 101 also serves as a bridge between the wireless mesh network nodes 102-103 and a network 104, such as the Internet. This enables network-connected devices such as a computer 105 or an Internet-enabled cellular telephone to control or interact with the controller 101, and control and configure the mesh network. For example, computer 105 may be used to configure the mesh network, and to retrieve and store information periodically gathered by the wireless mesh network nodes 102-103.

Figure 2:
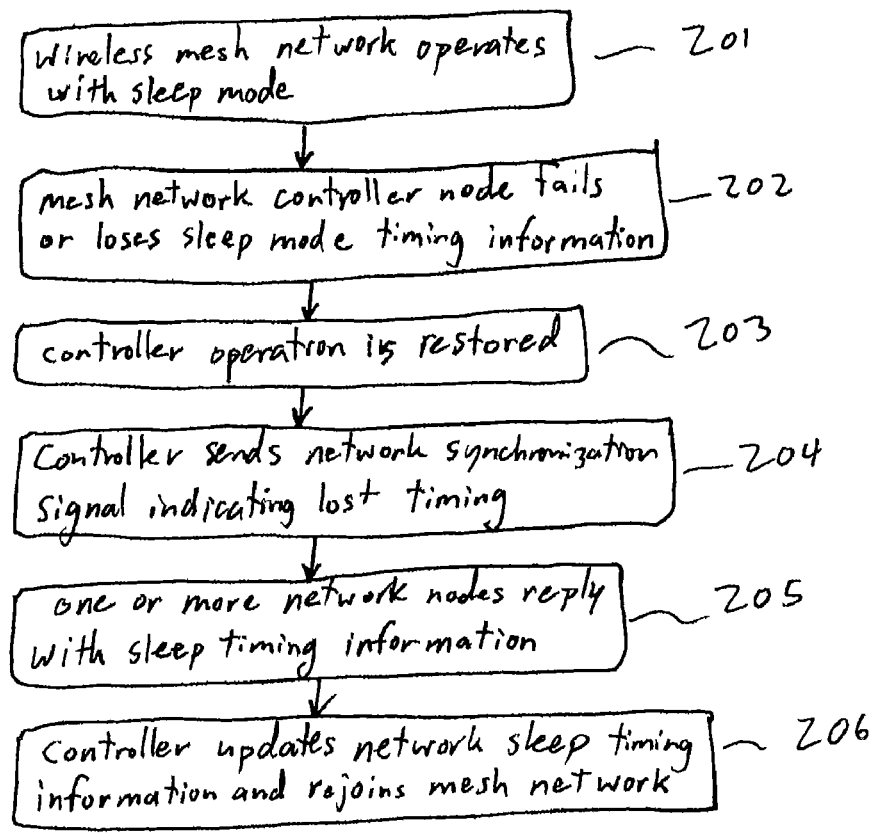
FIG. 2 is a flowchart illustrating a method of synchronizing sleep timing in a controller with an existing wireless mesh network, consistent with an example embodiment of the invention.

FIG. 2 is a flowchart of a method of synchronizing a controller with an existing network that sleeps, consistent with an example embodiment of the invention. A wireless mesh network including a controller operates normally at 201, including a sleep mode in which an extended sleep period is used to conserve battery power in one or more battery powered wireless mesh network devices. The mesh network controller loses sleep timing information at 202, such as by having its clock or timing data corrupted, or by failing and being replaced with another controller, while the remainder of the network operates as normal, sleeping for extended periods and waking briefly to exchange data from time to time.

Controller operation is restored at 203, such as by replacing a failed controller with a new controller, or an operational controller determining that its sleep timing data is not in synchronization with the mesh network. The controller is now perfectly functional, but is not in communication synchronization with the sleep schedule shared by the rest of the wireless mesh network. The controller therefore sends a network timing synchronization signal indicating that it is operational but does not have appropriate sleep timing information at 204, such as by repeating a traditional sync pulse at a significantly faster rate so that one or more mesh network nodes near the controller are able to detect the network timing synchronization signal at 205 during the brief wake period, and reply with the sleep timing information stored in each of the network nodes.

The controller then uses the received network sleep timing information to synchronize its communication schedule with the rest of the network, and is able to resume normal communication with the network and control over the network. Updating the controller using sleep timing information already distributed throughout the mesh network nodes provides a more efficient means of resynchronization of a controller with the network than having the network resend synchronization throughout the network, as only the controller needs to update its sleep timing information. The examples presented here also illustrate how a special signal that can be recognized by mesh network nodes during their brief wake period can be used to indicate that the controller has lost sleep synchronization or other network information, prompting one or more neighboring network nodes to relay the information back to the controller.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof. This application is intended to cover any adaptations or variations of the example embodiments of the invention described herein. It is intended that this invention be limited only by the claims, and the full scope of equivalents thereof.

What is claimed is:

1. A method of synchronizing a controller with an existing wireless mesh network, comprising:
    sending a network synchronization signal from the controller indicating that sleep timing information is lost; and
    receiving a reply from one or more wireless mesh network nodes within the existing wireless mesh network comprising sleep timing information for the wireless mesh network;
    wherein the network synchronization signal comprises a sync pulse repeated at a higher than normal rate, wherein the higher than normal rate is such that the network synchronization signal is sent at least twice during a minimum wake period of the wireless mesh network nodes.

2. The method of synchronizing a controller with an existing wireless mesh network of claim 1, further comprising updating sleep timing information in the controller to bring the controller into sleep schedule synchronization with the wireless mesh network.

3. The method of synchronizing a controller with an existing wireless mesh network of claim 1, wherein the controller is coupled to a power line and the one or more wireless mesh network nodes are battery powered.

4. The method of synchronizing a controller with an existing wireless mesh network of claim 1, wherein sending a network synchronization signal from the controller indicating that sleep timing information is lost includes determining, within the controller, whether the controller has the correct sleep timing information for the existing wireless mesh network.

5. A mesh network controller, comprising:
    a sleep module operable to coordinate sleeping among a plurality of mesh network nodes comprising a part of the mesh network to conserve power by coordinating sleep timing information among the mesh network nodes; and
    a communications module operable to send a network synchronization signal from the controller indicating that sleep timing information is lost in the controller, and to receive a reply from one or more wireless mesh network nodes within the wireless mesh network comprising sleep timing information for the wireless mesh network;
    wherein the network synchronization signal comprises a sync pulse repeated at a higher than normal rate, wherein the higher than normal rate is such that the network synchronization signal is sent at least twice during a minimum wake period of the wireless mesh network nodes.

6. The mesh network controller of claim 5, further comprising updating sleep timing information in the controller to bring the controller into sleep schedule synchronization with the wireless mesh network.

7. The mesh network controller of claim 5, wherein the controller is coupled to a power line.

8. The mesh network controller of claim 5, wherein the sleep module determines whether the sleep module has the correct sleep timing information for the mesh network.

9. A wireless mesh network node, comprising:
    a sleep module operable to receive sleep timing information from a controller or other wireless mesh network node such that the node is operable to sleep to conserve battery power on a schedule coordinated among nodes in the wireless mesh network; and
    a communications module operable to receive a network synchronization signal from the controller indicating that sleep timing information is lost in the controller, and to send a reply comprising sleep timing information for the wireless mesh network;
    wherein the network synchronization signal comprises a sync pulse repeated at a higher than normal rate, wherein the higher than normal rate is such that the network synchronization signal is sent at least twice during a minimum wake period of the wireless mesh network node.

10. The wireless mesh network node of claim 9, wherein the mesh network node is battery powered.

11. A non-transitory machine-readable medium with instructions stored thereon, the instructions when executed operable to cause a wireless mesh network controller to:
    coordinate sleeping among a plurality of mesh network nodes comprising a part of the mesh network to conserve power by coordinating sleep timing information among the mesh network nodes;
    send a network synchronization signal from the controller indicating that sleep timing information is lost in the controller; and receive a reply from one or more wireless mesh network nodes within the wireless mesh network comprising sleep timing information for the wireless mesh network;

wherein the network synchronization signal comprises a sync pulse repeated at a higher than normal rate, wherein the higher than normal rate is such that the network synchronization signal is sent at least twice during a minimum wake period of the wireless mesh network nodes.

12. The machine-readable medium of claim 11, the instructions when executed further operable to update sleep timing information in the controller to bring the controller into sleep schedule synchronization with the wireless mesh network.

13. The machine-readable medium of claim 11, wherein the controller determines if the controller has the correct sleep timing information for the wireless mesh network.

* * * * *